United States Patent Office 3,159,638
Patented Dec. 1, 1964

3,159,638
NOVEL 2-DEHYDROEMETINE INTERMEDIATES AND PROCESS FOR PREPARATION THEREOF
Alexander Crawford Ritchie, Ware, and Dennis Edward Clark, Chalfont St. Peter, England, assignors to Glaxo Laboratories Limited, Greenford, England, a British company
No Drawing. Filed Aug. 20, 1962, Ser. No. 218,137
Claims priority, application Great Britain, Sept. 1, 1961, 31,571/61
16 Claims. (Cl. 260—287)

This invention concerns novel intermediates useful in the preparation of 2-dehydroemetine and related compounds.

Copending U.S. application Serial No. 111,908, now U.S. Patent 3,105,835, describes the preparation, as intermediates in the synthesis of emetine and its derivatives, of compounds of the skeletal formula

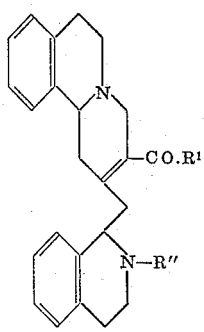

(I)

where $R^1$ and $R''$ are aliphatic, araliphatic or aryl groups such as alkyl groups or arylmethyl groups. $R''$ is usefully an arylmethyl group in that such a group may generally be removed by hydrogenolysis, without attack at other points of the molecule, to yield free secondary bases analogous to emetine itself. $R''$ may also advantageously be an alkyl group, which may be substituted, for example by hydroxy, oxo or acyloxy groups, in that certain of such groups confer desirable properties when attached in the 2′-position of (−)-emetine and 2-dehydroemetine. Such alkyl groups preferably possess 1–7 carbon atoms, advantageously 1–4 carbon atoms. The ketones of Formula I may thus be used as intermediates in the preparation of 2-dehydroemetine and related compounds.

We have now found that the above 2-dehydroemetine and analogous compounds may be prepared advantageously from compounds of formula I by way of intermediates of the skeletal formula

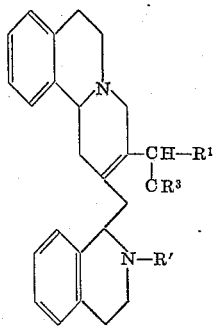

(II)

where $R^1$ and $R''$ are aliphatic, araliphatic or aryl groups phatic, or aromatic hydrocarbon group and $R^3$ is an acyl group, since we have found that the allylic oxygen function of such compounds may be reduced particularly readily by metal/ammonia and metal/primary amine reducing systems.

According to the present invention, therefore, we provide a process for the preparation of compounds of the skeletal formula

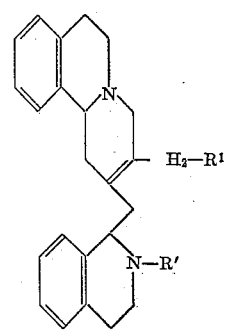

(III)

in which a compound of skeletal Formula II is reduced with a metal/ammonia or metal primary/amine reducing system, $R'$, $R^1$ and $R^3$ having the meanings given above.

Compounds of skeletal Formula II, where $R'$, $R^1$ and $R^3$ have the above meanings, are new and constitute a feature of the present invention. $R^1$ is preferably an alkyl group, especially a methyl group, since the reduction leads to products with a 3-alkyl group, e.g., an ethyl group as in emetine. $R^3$ is preferably a lower aliphatic acyl or aroyl group, preferably an acetyl group since such groups lead to particularly easy reduction.

As indicated above $R'$ is advantageously an arylmethyl group such as benzyl group due to its inert character and its ease of removal; it can readily be removed hydrogenolytically after the metal/ammonia reduction. $R'$ may also advantageously be an alkyl group having 1–7 preferably 1–4, carbon atoms, optionally carrying substituents such as hydroxyl or acyloxy groups.

Thus, for example, the present process may be used for the reduction of compounds, described in copending U.S. application Serial No. 40,200, now U.S. Patent 3,121,720, of skeletal formula

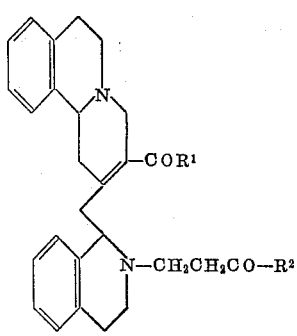

(IV)

where $R^2$ is an aliphatic or araliphatic hydrocarbon group and $R^1$ has the above meaning, since after reduction of the ketone groups to hydroxyl groups and esterification, the allylic oxygen function may be selectively reduced without substantial attack at the saturated oxygen function. For this reason the intermediates of the skeletal formula

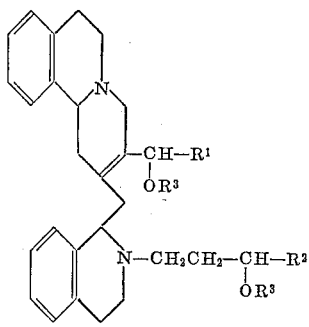

where R¹, R² and R³ have the above meanings, are useful in preparing 2′-substituted dehydroemetine derivatives.

The compounds may be substituted in the 3′, 4′, 5′, 6′, 7′, 8′, 6, 7, 8, 9, 10 and 11 positions by such groups as aliphatic, aromatic or araliphatic hydrocarbon, ether or thioether groups or tertiary amino groups preferably having 1–4 carbon atoms, e.g., methyl ethyl propyl, butyl, amyl, benzyl, phenyl, methoxy, ethoxy, propoxy, butoxy, amyloxy, benzyloxy, phenoxy, dialkylamino groups etc. Groups may also occupy more than one position as in methylene dioxy groups. According to a feature of the invention the 6′, 7′, 9 and 10 positions preferably carry methoxy groups, the remaining positions being unsubstituted.

The metal ammonia reducing system may comprise, for example, an alkali metal or alkaline earth metal, preferably lithium or calcium and liquid ammonia. An inert solvent is usefully present as a vehicle for introducing the material to be reduced for example an ether such as tetrahydrofuran, dimethoxyethane, diethyl ether etc. In the metal/primary amine system, the amine is conveniently a lower alkyl amine such as ethylamine or a diamine such as ethylene diamine. Care should be taken however, that the aromatic rings are not attacked when such a system is used.

In the reduction of compounds of skeletal Formula V, where R³ is an acyl group, the non-allylic acyloxy group is not reduced but is nevertheless usually hydrolysed to yield the corresponding hydroxy compound. If hydrolysis is not complete, a separate hydrolysis step may be employed, e.g., using aqueous alkali preferably in the presence of a solvent such as an alkanol, e.g., methanol or ethanol, to solubilize the compound. If it is desired to prepare 2-dehydroemetine compounds which are unsubstituted at the 2′-nitrogen atom, it is possible to oxidise the hydroxy alkyl side chain to the corresponding oxo-alkyl side chain which may then be removed by treatment with hydrazine or with a base, e.g., an alkali such as an alkali metal hydroxide, etc., or an organic base. If Oppenauer oxidation using an alkali metal alkoxide with a ketone is employed, the conditions generally lead to spontaneous removal of the oxo-alkyl chain when formed. Furthermore, when such highly alkaline conditions are used, it is possible to use as starting material incompletely hydrolysed acyl derivatives of compounds of skeletal Formula III in which R is a 3-hydroxy butyl group without the separate hydrolysis step referred to above. The preferred Oppenauer reagents are sodium t-butoxide or, more conveniently, potassium t-butoxide and benzophenone in t-butanol/benzene.

Compounds of skeletal Formula II or V in which R³ is acyl, may be prepared by reaction of the corresponding alcohols (R³=H) with acylating agents, such as the appropriate acid anhydrides, preferably in the presence of acid, e.g., perchloric, sulphuric, acetic or p-toluene sulphonic acid, or a base such as an alkali metal carbonate or acetate or pyridine. Acid halides and other acylating agents can also advantageously be used. Since the acetoxy derivatives are especially preferred, the reagent of choice is acetic anhydride.

The parent alcohols (skeletal Formulae II and V; R³=H) may be prepared from the ketones of skeletal Formulae I and IV respectively by reduction, for example, with a metal hydride reducing agent, e.g., a borohydride or aluminium hydride of an alkali metal or alkaline earth metal. An inert solvent is preferably present. For sodium or potassium borohydride, the solvent is preferably an alcohol, such as methanol, ethanol etc., optionally in the presence of a hydrocarbon solvent such as benzene, toluene, etc. Where lithium borohydride or lithium aluminium hydride are used, the inert solvent is preferably an ether solvent such as tetrahydrofuran or diethyl ether.

It should be noted that the reduction of the keto groups in the compounds of Formulae I and IV introduces further asymmetric centres and hence gives rise to possible stereo-isomers. However, in the subsequent reactions according to the invention, these asymmetric centres are removed and it may be preferable, therefore, to use the mixture of isomers without separation.

The compounds of the skeletal formulae shown herein possess asymmetric centres at the 11b- and 1′-positions, thus leading to a number of stereoisomeric forms. The configuration of the hydrogen atoms at the 11b- and 1′-positions of natural emetine and of 2-dehydroemetine is that in the reaction sequence shown below for the production of 2-dehydroemetine namely with the 11b and 1′ hydrogen atoms in the α-configuration in the various formulae herein and this stereoisomeric form is therefore preferred.

For the better understanding of the invention the following examples are given by way of illustration only. The reactions illustrated in Examples 1–5 are shown diagrammatically in the following reaction scheme which also serves to identify the compounds used in the examples.

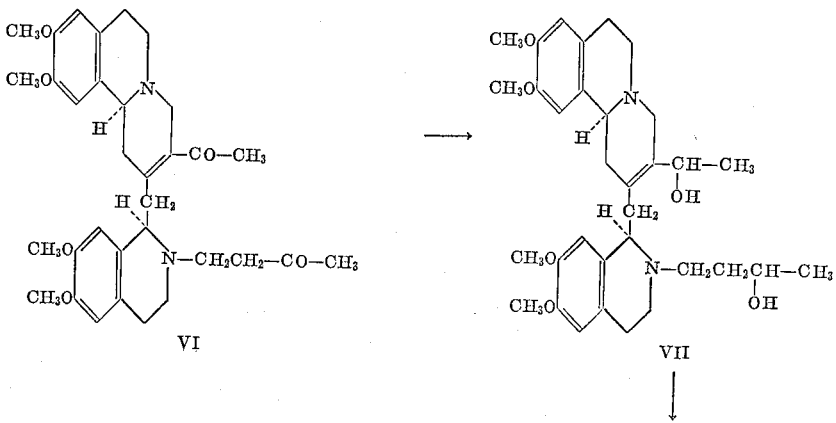

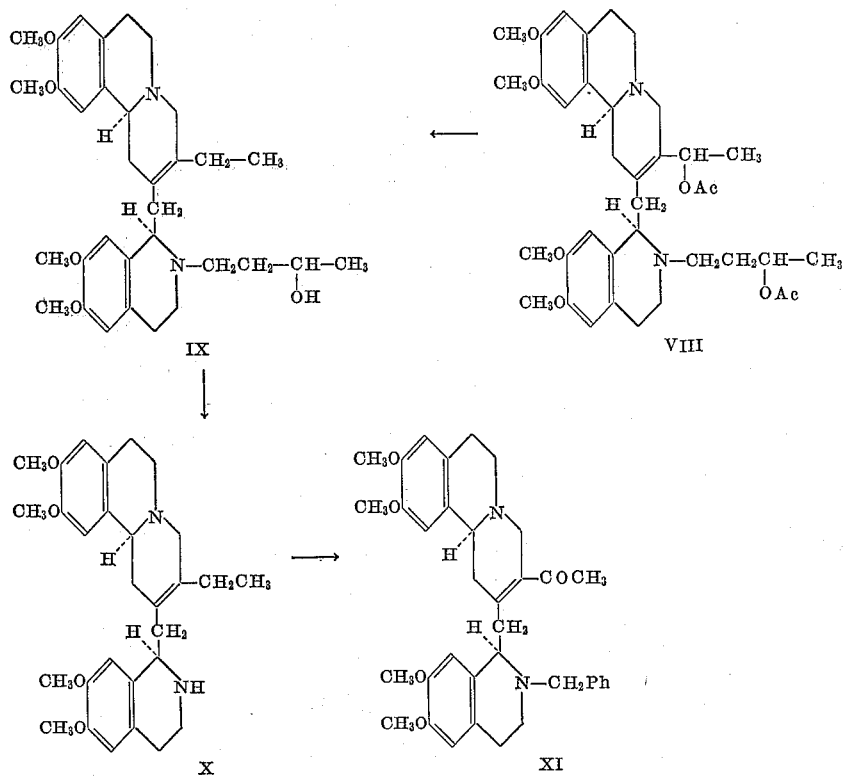

EXAMPLE 1

*Reduction of 3-Acetyl-1,4,6,7-Tetrahydro-9,10-Dimethoxy - 2 - [1',2',3',4'-Tetrahydro - 6',7' - Dimethoxy-2'-(3"-Oxobutyl) Isoquinol-1'-Yl]Methyl-11b[H]-Benzo-[a]-Quinolizine (VI) With Sodium Borohydride.*

Sodium borohydride (7 g.) in water (60 ml.) was added at 15–20° to the diketone (VI) (20 g.) in methanol (250 ml.) and benzene (30 ml.). After 30 min. the organic solvents were removed by evaporation in vacuo, the residue was diluted with water, and the mixture was then acidified with concentrated hydrochloric acid (24 ml.). The solution was neutralised with 2 N-sodium hydroxide and the basic product was extracted with benzene (3 x 80 ml.). After being washed with water (3 x 50 ml.), the combined benzene extracts were dried (MgSO$_4$) and evaporated to a slurry. Addition of ether gave the diol (VII) as a white crystalline solid (13.93 g.), M.P. 128° with previous softening.

EXAMPLE 2

*Preparation of Diol Diacetate (VIII)*

(a) The diol (VII) (12.5 g.) in benzene (100 ml.) was heated at reflux with acetic anhydride (10 ml.) containing 60% aqueous perchloric acid (3 drops) for 1½ hr. The basic product was extracted from solution with 2 N-hydrochloric acid (20 ml.) and water (2 x 20 ml.) and the combined aqueous acid extracts were neutralised with sodium bicarbonate in the presence of chloroform (40 ml.). The layers were separated and the aqueous phase was extracted with chloroform (2 x 40 ml.). Evaporation of the solvent from the washed and dried chloroform extracts gave the diol diacetate (VIII) (12.04 g.) as a pale yellow froth which was homogeneous on thin layer chromatography.

(b) The diketone (VI) (20 g.) was reduced with sodium borohydride and the basic product was extracted into benzene as in (1) above. The benzene solution was concentrated to a volume of ca. 150 ml. and acetic anhydride (20 ml.) and sulphuric acid (3 drops) were added. Acetylation and working-up as in Example (a) gave the diol diacetate as a crude gum. This was triturated with ether and the insoluble solid (2.43 g.) removed. Evaporation of the ethereal solution gave the diol diacetate (VIII) (18.7 g.) as a homogeneous pale yellow froth.

EXAMPLE 3

*(±) N-(3-Hydroxybutyl)Dehydroemetine*

The diol diacetate (VIII) (12.87 g.) in tetrahydrofuran (100 ml.) was added over 10 min. to lithium (0.7 g.) in liquid ammonia (300 ml.). After 5 min., acetone (2 ml.) was added to discharge the blue colour and the solvents were removed by evaporation. The residue was diluted with water and extracted with benzene (3 x 50 ml.). The combined extracts were washed with water (3 x 50 ml.) and the solvent removed in vacuo to a pale foam (10.87 g.).

The crude product (8 g.) was absorbed on alumina (Grade H; 400 g.) in benzene and eluted with 50% ethyl acetate-benzene (1 l.) and ethyl acetate (2.5 l.). Evaporation of the eluates gave (±) N-(3-hydroxybutyl) dehydroemetine (6.12 g.) as a foam.

EXAMPLE 4

*± Dehydroemetine Hydrochloride*

(a) (±) N-(3-hydroxybutyl)dehydroemetine (5.79 g.) was heated at reflux under nitrogen for 16 hr. in t-butanol (80 ml.) containing potassium t-butoxide (from 2.4 g. of potassium), benzophenone (19 g.), and benzene (45 ml.). The mixture was cooled, acidified with concentrated hydrochloric acid, and the solvent removed in vacuo. The residue was taken up in water and extracted with benzene (3 x 50 ml.). The aqueous acidic layer was neutralised with 2 N-sodium hydroxide solution and the basic product extracted with ether (4 x 30 ml.). Evaporation of the washed, ethereal extracts gave (±) dehydroemetine as a pale form, which was converted into the hydrochloride by dissolution in methanol (25 ml.) and acidification with methanolic hydrogen chloride. The hydrochloride (4.49 g.) separated as white crystals, M.P. 242–244° (decomp.).

(b) The diol diacetate (9. g.) in tetrahydrofuran (60 ml.) was reduced with lithium (0.485 g.) in liquid ammonia (200 ml.) as described in example (3) above. The crude (±) N-(3-hydroxybutyl)dehydroemetine (7.32 g.), was not chromatographed, but was oxidised by the Oppenauer method described in Example (a) above to crude (±) dehydroemetine. This was obtained as a pale foam (5.16 g.) which was taken up in methanol (25 ml.) and treated with methanolic hydrogen chloride. The pure hydrochloride of (±)-dehydroemetine separated as a pale crystalline solid (4.0 g.), M.P. 247–249° (decomp.).

EXAMPLE 5

*Reduction of Diol Diacetate (VI) With Calcium in Liquid Ammonia*

The diacetate (5 g.) in dry tetrahydrofuran (60 ml.) was added dropwise over 25 minutes to a solution of calcium (1 g.) in refluxing liquid ammonia (200 ml.). After a further 40 min. acetone was added to discharge the blue colour, followed by ethanol (5 ml.). The ammonia was removed and the residue heated at 100° for 10 minutes with 2 N-sodium hydroxide solution. Chloroform (200 ml.) was added and the emulsion was clarified by filtration through kieselguhr. The alkaline layer was extracted with chloroform (2 x 50 ml.) and the combined organic extracts were washed with water (2 x 300 ml.) and dried ($MgSO_4$). Evaporation of the solvent gave crude (±)-N-(3-hydroxybutyl)dehydroemetine as a pale foam (3.75 g.). Oppenauer oxidation of a portion of this material as in Example 4 gave crude (±) dehydroemetine, which yielded the pure hydrochloride, M.P. 244–247° (decomp.), after crystallisation from methanol.

EXAMPLE 6

To a solution of the diketone (VI) (25 g.) in methanol (150 ml.) and benzene (25 ml.) at 0°, a solution of sodium borohydride (9 g.) in water (25 ml.) was added over five minutes and the mixture stirred for a further 55 minutes. The mixture was acidified with hydrochloric acid (23 ml.) and evaporated to dryness in vacuo. The residue was taken up in 2 N-sodium hydroxide (100 ml.) and extracted with chloroform (1 x 100 ml., 2 x 25 ml.) and the extracts washed with water (2 x 50 ml.) The chloroform solution was evaporated to give a froth (26.92 g.) The latter was taken up in benzene (250 ml.), the solution dried azeotropically and anhydrous potassium carbonate (5 g.) and acetic anhydride (10 ml.) added. The mixture was refluxed overnight, filtered and evaporated to a froth. The latter was treated with ether (100 ml.) and the solution filtered and re-evaporated to a froth of diol diacetate (VIII) (28 g.) This was dissolved in dry ether (300 ml.) and the solution added to 600 ml. redistilled ammonia. Lithium (c. 2 g.) was added in small portions to a permanent blue colour and after stirring for five minutes, ammonium chloride was added to destroy excess lithium. The solvents were evaporated off and the residue dissolved in benzene (200 ml.) and water (50 ml.) and separated. The benzene solution was washed with water and the combined aqueous washings extracted with benzene (25 ml.). The benzene solutions were evaporated to dryness to give 25 g. of froth.

The latter was heated under reflux overnight with a solution of 4.75 g. potassium in 112 ml. tert.-butyl alcohol, 25 g. benzophenone and 50 ml. benzene. The following day the mixture was acidified with hydrochloric acid (20 ml.) and evaporated to a gum. Benzene (200 ml.) and water (200 ml.) were added and separated and the benzene layer extracted with water (200 ml.) The combined aqueous extracts were washed with ether and basified with 2 N-sodium hydroxide and extracted with ether (4 x 100 ml.). The ethereal extracts were washed, dried (sodium sulphate) and evaporated and the residue dissolved in methanol (40 ml.) and acidified with methanolic hydrogen chloride. The dehydroemetine dihydrochloride separated as a white crystalline solid, 14.02 g., M.P. 246–249° (decomp.).

EXAMPLE 7

10 g. of diketone (VI) were treated as in Example 6, but the lithium was replaced by sodium (4.5 g.). The final weight of dehydroemetine hydrochloride was 2.2 g.

EXAMPLE 8

100 g. of diketone (VI) were treated as in Example 6, but the ether used as solvent in the ammonia reduction was replaced with dimethoxyethane. The final weight of dehydroemetine hydrochloride was 45 g.

We claim:

1. The process for preparing a compound of the formula

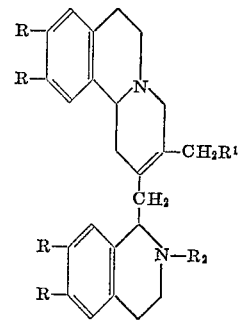

where R is selected from the group consisting of hydrogen, lower alkoxy and methylene dioxy; $R^1$ is lower alkyl and $R^2$ is selected from the group consisting of lower alkyl, 3-hydroxy lower alkyl, 3-acyloxy lower alkyl, and benzyl in which an ester of the formula

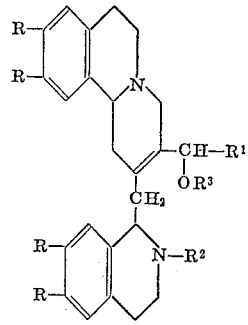

where R, $R^1$ and $R^2$ have the above meanings and $R^3$ is lower aliphatic acyl is reduced with a mixture of (1) a metal selected from the group consisting of alkali and alkaline earth metals and (2) a member selected from the group consisting of ammonia and lower alkyl primary amines.

2. A process as claimed in claim 1 where R is lower alkoxy, $R^1$ is lower alkyl, $R^2$ is 3-acyloxy-alkyl, $R^3$ is acetyl and the reducing agent is lithium and ammonia.

3. A process as claimed in claim 1 wherein R is lower alkoxy; $R^1$ is lower alkyl; $R^2$ is benzyl; $R^3$ is acetyl and the reducing agent is lithium and ammonia.

4. A process as claimed in claim 1 wherein R is lower alkoxy, $R^1$ is lower alkyl, $R^2$ is 3-acyloxy-alkyl, $R^3$ is acetyl and the reducing agent is calcium and ammonia.

5. A process as claimed in claim 2 where the 3-acyloxyalkyl is removed subsequently by oxidation with an alkali metal t-butoxide in the presence of a di-(monocyclic aryl) ketone.

6. A process for preparing a compound of the formula

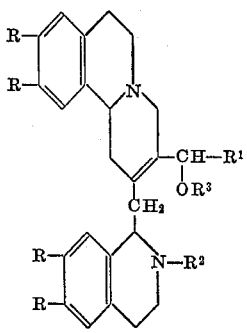

where R is selected from the group consisting of hydrogen, lower alkoxy and methylene dioxide, $R^1$ is lower alkyl, $R^2$ is selected from the group consisting of lower alkyl, 3-hydroxy lower alkyl, 3-acyloxy lower alkyl and benzyl and $R^3$ is lower aliphatic acyl by reducing a compound of the formula

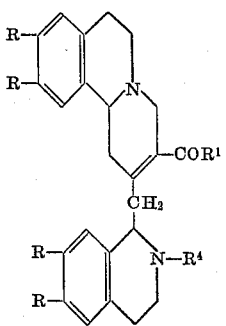

where R and $R^1$ have the above meanings and $R^4$ is selected from the group consisting of $R^2$ and a ketoalkyl containing 1–7 carbon atoms with a metal hydride reducing agent wherein the metal is selected from the group consisting of alkali and alkaline earth metals and then reacting the reduced product with an acylating agent selected from the group consisting of acid anhydrides and acid halides.

7. The process as claimed in claim 6 where R is lower alkoxy, $R^4$ is —$CH_2$—$CH_2$—CO—$R^5$ wherein $R^5$ is alkyl of 1–4 carbon atoms and the reducing agent is an alkali metal borohydride.

8. A process as claimed in claim 6 where the reducing agent is an alkaline earth metal borohydride, R is lower alkoxy and $R_4$ is —$CH_2CH_2$—CO—$R^5$ wherein $R^5$ is alkyl of 1–4 carbon atoms.

9. A process as claimed in claim 6 wherein the reducing agent is an aluminium hydride, R is lower alkoxy and $R^4$ is —$CH_2$—$CH_2$—CO—$R^5$ wherein $R^5$ is alkyl of 1–4 carbon atoms of an alkali metal hydride.

10. A process according to claim 9 where $R^5$ is methyl.

11. A compound selected from the group consisting of compounds of the formula

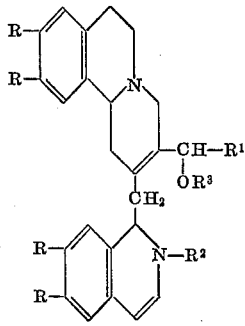

where R is selected from the group consisting of hydrogen, lower alkoxy and methylene dioxide, $R^1$ is lower alkyl, $R^2$ is selected from the group consisting of lower alkyl, 3-hydroxy lower alkyl, 3-acyloxy lower alkyl and benzyl and $R^3$ is selected from the group consisting of hydrogen and lower aliphatic acyl and physiologically acceptable acid addition salts thereof.

12. A compound as claimed in claim 11 where R is lower alkoxy, $R^1$ is methyl, $R^2$ is benzyl and $R^3$ is acetyl.

13. A compound as claimed in claim 11 where R is lower alkoxy, $R^1$ is methyl, $R^2$ is 3-hydroxy lower alkyl and $R^3$ is acetyl.

14. A compound as claimed in claim 11 where R is lower alkoxy, $R^1$ is methyl, $R^2$ is 3-acyloxy lower alkyl and $R^3$ is acetyl.

15. A compound as claimed in claim 12 where R is methoxy.

16. A process as claimed in claim 1 in which the hydrogen atoms in the 11b and 1' positions in the compounds are in the α-configuration.

References Cited in the file of this patent
UNITED STATES PATENTS
3,102,118     Clark et al. _____ Aug. 27, 1963

OTHER REFERENCES
Clark et al.: J. Chem. Soc., 1962, pages 2490 to 2499.
Ritchie et al.: J. Chem. Soc., 1962, pages 3385 to 3393.
Brossi et al.: Helv. Chim. Acta., vol. 42, pp. 772–88 (1959).